ental Patent

(12) United States Patent
Liu et al.

(10) Patent No.: US 7,961,646 B2
(45) Date of Patent: Jun. 14, 2011

(54) MULTICAST MESH ROUTING PROTOCOL

(75) Inventors: Hang Liu, Yardley, PA (US); Jun Li, Plainsboro, NJ (US); Saurabh Mathur, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 751 days.

(21) Appl. No.: 11/919,099

(22) PCT Filed: Apr. 25, 2005

(86) PCT No.: PCT/US2005/014058
§ 371 (c)(1),
(2), (4) Date: Oct. 23, 2007

(87) PCT Pub. No.: WO2006/115487
PCT Pub. Date: Nov. 2, 2006

(65) Prior Publication Data
US 2009/0303902 A1 Dec. 10, 2009

(51) Int. Cl.
*H04L 12/56* (2006.01)
(52) U.S. Cl. .................. 370/254; 370/231
(58) Field of Classification Search .......... 370/254, 370/390, 338, 256, 252, 389, 331, 310, 393; 714/4
See application file for complete search history.

(56) References Cited

U.S. PATENT DOCUMENTS

| 5,331,637 | A | 7/1994 | Francis et al. |
| 5,704,032 | A | 12/1997 | Badovinatz et al. |
| 5,787,249 | A | 7/1998 | Badovinatz et al. |
| 6,732,189 | B1 | 5/2004 | Novaes |
| 6,735,200 | B1 * | 5/2004 | Novaes .......... 370/390 |
| 6,751,747 | B2 * | 6/2004 | Li .................. 714/4 |
| 6,791,981 | B1 | 9/2004 | Novaes |
| 7,116,640 | B2 * | 10/2006 | Tasman et al. ......... 370/252 |
| 7,200,114 | B1 * | 4/2007 | Tse-Au ............. 370/231 |
| 7,649,884 | B1 * | 1/2010 | Ahmed et al. ........ 370/390 |
| 7,688,756 | B2 * | 3/2010 | Allan et al. .......... 370/254 |
| 2003/0131082 | A1 | 7/2003 | Kachi |
| 2003/0165140 | A1 | 9/2003 | Tang et al. |
| 2003/0174706 | A1 * | 9/2003 | Shankar et al. ....... 370/393 |
| 2004/0029553 | A1 | 2/2004 | Cain |
| 2005/0180345 | A1 * | 8/2005 | Meier ............... 370/310 |
| 2006/0285529 | A1 * | 12/2006 | Hares et al. ......... 370/338 |
| 2007/0025276 | A1 * | 2/2007 | Zwiebel et al. ....... 370/256 |
| 2007/0140245 | A1 * | 6/2007 | Anjum et al. ........ 370/390 |

(Continued)

FOREIGN PATENT DOCUMENTS

| JP | 2005038099 | 2/2005 |
| WO | WO 0221770 | 3/2002 |

OTHER PUBLICATIONS

International Search Report, dated Aug. 22, 2005.

*Primary Examiner* — Thong Vu
(74) *Attorney, Agent, or Firm* — Robert D. Shedd; Joseph J. Opalach; Catherine A. Cooper

(57) ABSTRACT

A method for a node to select a route to join a multicast group in a wireless mesh network, including establishing the route between the node and the multicast group using media access control addresses is described. A method for determining a multicast group leader of the multicast group of a wireless mesh network using media access control addresses is also described.

31 Claims, 4 Drawing Sheets

U.S. PATENT DOCUMENTS

2007/0189249 A1* 8/2007 Gurevich et al. ............. 370/338
2008/0031178 A1* 2/2008 Vilei et al. .................... 370/312
2008/0062923 A1* 3/2008 Ponnuswamy ............... 370/331
2008/0084878 A1* 4/2008 Akbar et al. .................. 370/390
2008/0170550 A1   7/2008 Liu et al.
2008/0205385 A1* 8/2008 Zeng et al. .................... 370/389

* cited by examiner

MULTICAST MESH ROUTING PROTOCOL

This application claims the benefit, under 35 U.S.C. §365 of International Application PCT/US2005/014058, filed Apr. 25, 2005, which was published in accordance with PCT Article 21(2) on Nov. 2, 2006 in English.

FIELD OF THE INVENTION

The present invention relates to a multicast routing mechanism for discovering and establishing the paths for communications among the members in a multicast group. In particular, the present invention relates to determining multicast routes and forwarding the data from any member in the multicast group to all other members in a wireless mesh network based on the multicast group's media access control addresses.

BACKGROUND OF T INVENTION

A wireless local area mesh network consists of multiple nodes (also called mesh points) interconnected via IEEE 802.11 radio links. Each node has its unique IEEE 802.11 Media Access Control (MAC) address. A subset of nodes in the mesh network may join a multicast group to communicate with each other. A multicast group has its own group IEEE 802.11 MAC address for communications among the multicast group members. Multicast offers efficient utilization of network resource to deliver data from a source to multiple destination nodes (multicast group). For example, a number of nodes in the mesh network might join a multicast group for video conferencing. When a member node in a multicast group sends the data to all other member nodes, it uses the multicast group's common IEEE 802.11 MAC address as the destination address. The multicast group membership information, i.e. which nodes are members of the multicast group, is required to establish the paths/routes between the members of the multicast group in a wireless mesh network and to deliver the data.

The IP layer multicast routing protocols have been used to discover and establish the routes for a multicast group in wired and wireless networks. However, the IP layer multicast routing protocols are based on the IP addresses. Some of devices, such as wireless local area network (WLAN) access points, forward data packets based on the IEEE 802.11 MAC address and only operate at the link layer (Layer 2). In addition, data forwarding at Layer 2 is generally faster than that at the IP layer (Layer 3) because the data packet does not have to pass to the IP layer. Therefore, multicast mesh routing mechanisms at layer 2 are needed to forward data among the members of a multicast group based on the multicast group's IEEE 802.11 MAC address in wireless mesh networks.

The Protocol Independent Multicast-Sparse Mode (PIM-SM) and the Protocol Independent Multicast-Dense Mode (PIM-DM) are two standard IP multicast routing protocols. PIM-DM employs a flooding and then pruning approach, which results in large overhead. PIM-SM employs a join/prune approach, which is more efficient in terms of network resource utilization. However, PIM-SM is designed for wired Internet and requires manual configurations such as configuration of the static multicast group address-to-root address mapping in every node or configuration of a bootstrap server in the network to announce this mapping. Manual configurations are not well suited for dynamic mesh networks since the network may be formed in an ad hoc fashion and the network nodes/topology frequently change. As nodes join and depart from the mesh network the topology changes.

What is needed is a multicast mesh routing protocol for wireless local area mesh networks to discover and establish the paths among the multicast group members for communications based on the multicast group's IEEE 802.11 media access control addresses. The problem solved by the present invention is how to efficiently establish the multicast routes and forward the data from any member node in the multicast group to all other members based on the multicast group's IEEE 802.11 MAC address.

SUMMARY OF THE INVENTION

A wireless local area mesh network consists of multiple nodes interconnected via IEEE 802.11 links. A subset of nodes in the mesh network may join a multicast group for communications among the members of the multicast group using the multicast group's IEEE MAC address. The present invention provides a mechanism for discovering and establishing the route and forwarding data from any member in the multicast group to all other multicast group members based on the group's IEEE 802.11 Media Access Control (MAC) address.

The multicast mesh routing protocol of the present invention discovers and establishes the paths/routes among the multicast group members based on the multicast group's IEEE 802.11 MAC address. The present invention performs multicast routing function at layer 2 (data link layer) so that a member node in the multicast group can efficiently send data to all other members in the multicast group based on the group's IEEE 802.11 medium access control (MAC) address. It automatically selects the multicast group leader without any configuration. The present invention does not care about the underlying unicast routing protocol, but relies on the available unicast routing protocol to obtain network topology information. The underlying unicast routing protocol maintains route/path information to all destination nodes in the wireless mesh network. As long as the multicast group leader is known or as soon as the multicast group leader is determined, a multicast tree can be formed reducing routing delays. For efficient multicast traffic forwarding, the protocol of the present invention creates a shared tree rooted at the multicast group leader for each multicast group, and optionally builds source-specific shortest-path trees. The data can then be transmitted/forwarded from any group member to all other members based on the multicast group's IEEE 802.11 MAC address.

A method for a node to select a route to join a multicast group in a wireless mesh network, including establishing the route between the node and the multicast group using media access control addresses is described. A method for determining a multicast group leader of the multicast group in a wireless mesh network using media access control addresses is also described.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

A node can dynamically join or leave/exit/depart a mesh network. A node can dynamically join or leave/exit/depart a multicast group. Leaving a multicast group does not necessarily mean that the departing node has left the mesh network. However, leaving the mesh network does imply that the departing node has also left the multicast group. Each multicast group has a multicast group leader. The multicast group leader is automatically determined in a distributed manner without requiring any configuration or central control. The first node in the mesh network joining the multicast group becomes the multicast group leader. If multiple nodes in the mesh network join the group at the same time, the node with the lowest IEEE 802.11 MAC address becomes the multicast group leader. A new multicast group leader is created once the current multicast group leader fails so that there is no central point of failure. The multicast group leader periodically floods the Group Hello (GHLO) message across the mesh network. The Group Hello (GHLO) message contains the multicast group information, including the multicast group's IEEE 802.11 MAC address, its leader's IEEE 802.11 MAC address, the optional layer 3 information of the multicast group leader (e.g. IP address) and the sequence number. The sequence number is incremented by 1 for every new Group Hello message sent by the multicast group leader. If a node is the leader of multiple multicast groups, it can combine the information of these multicast groups in one GHLO message. Each node in the wireless mesh network also maintains a multicast information base (MIB) to store the information of the active multicast groups in the mesh network received from GHLOs, which means that a node desiring to join a multicast group can do so virtually immediately. Even before a node joins a multicast group, the node can send data to the multicast root node (multicast group leader) in unicast and the multicast root node can re-distribute the data through the multicast group shared tree.

The present invention performs routing functions at layer 2 (data link layer) so that the packets can be transmitted and forwarded from the source node in a multicast group to multiple destination nodes in the multicast group based on the multicast group's IEEE 802.11 MAC addresses. The multicast mesh routing mechanism of the present invention may be used for client-server application configurations/topologies, peer-to-peer application configurations/topologies and hybrid application configurations/topologies.

Figure 1:
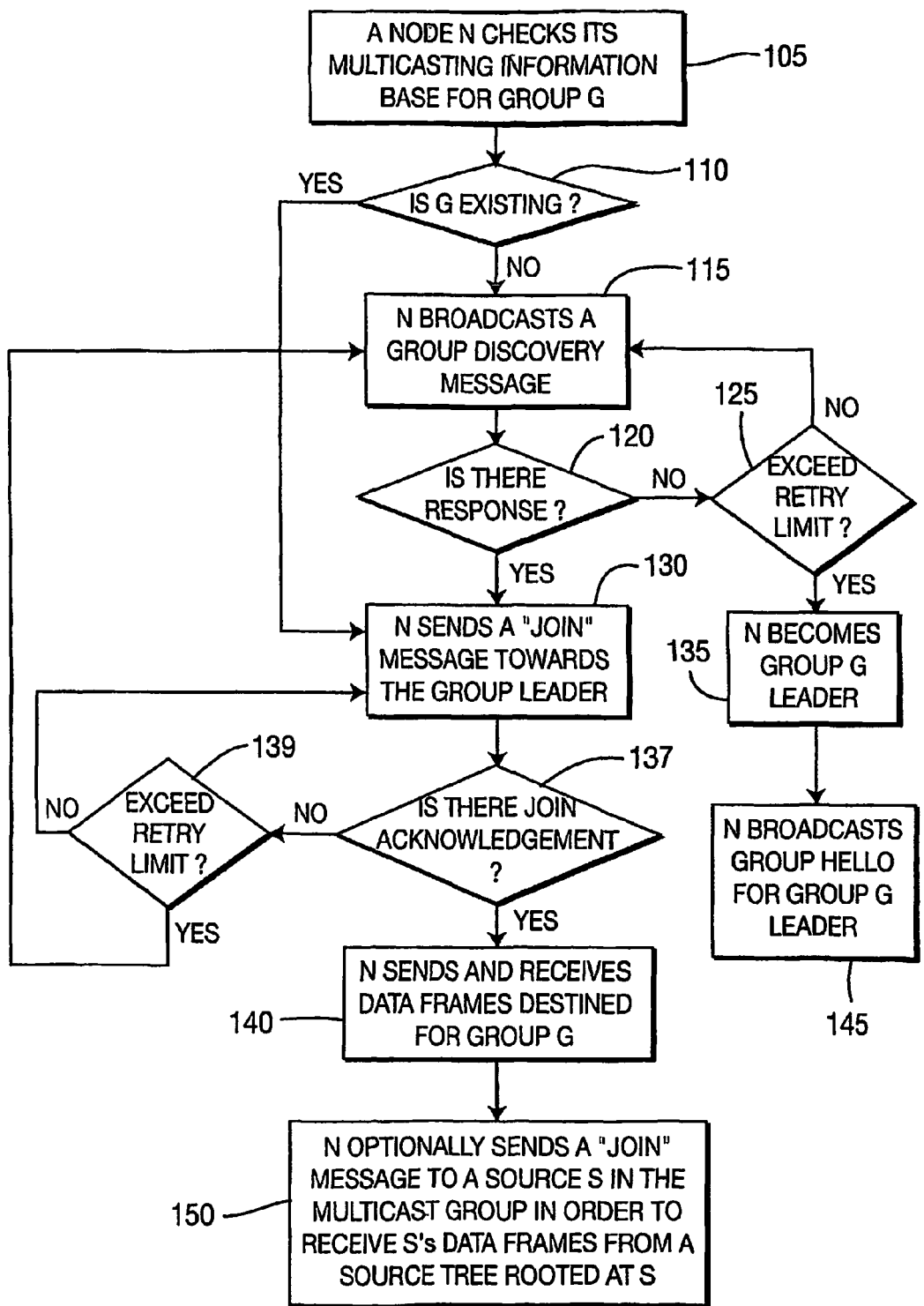
FIG. 1 is a flowchart a node in a mesh network follows to join a multicast group.

Referring to FIG. 1, which is a flowchart illustrating how a node in a mesh network joins a multicast group, when a node wants to send or receive data/traffic destined for a multicast group, i.e. to join a multicast group, the node checks its multicast information base for the group information according to the group's IEEE 802.11 MAC address at 105. A determination is made at 110 if multicast group G exists by ascertaining if there is any information concerning multicast group G in the multicast information base of the joining node. If there is no information for this group, the joining node broadcasts a Group Discovery (GDIS) message across the network at 115. The GDIS message includes the originator's IEEE 802.11 MAC address, the control message sequence number, the originator's optional layer 3 information (e.g. IP address), the destination IEEE 802.11 MAC address (i.e. the multicast group address to be joined) and a time-to-live parameter. When a node receives a GDIS message, the receiving node checks its multicast information base. The multicast group leader (the root of the multicast group shared tree) or a multicast group member may respond to the GDIS message with a Group Discovery Reply (GDRE) message. The GDRE message contains the multicast group information, including the multicast group leader's IEEE 802.11 MAC address, the optional layer 3 information of the multicast group leader, the multicast group's sequence number. The GDRE message will be returned to the GDIS's originator, i.e. the joining member node, in unicast according the underlying unicast routing protocol. It is assumed that a unicast routing protocol maintains the routes to all the destinations in the mesh network. An example of such a unicast routing protocol is the standard Optimized Link State Routing Protocol (OLSR) using IEEE 802.11 MAC addresses. If a node receiving a GDIS message does not have the requested multicast group information, it will propagate the GDIS message to all of its other neighbors. The originator waits for the term of the discovery period to receive a reply or replies at 120. If there is no reply then the originator retransmits/re-broadcasts the GDIS message at 115 with the message sequence number incremented by 1. The originator continues in this manner until it receives a reply or the retry limit has been exceeded at 125. If no reply is received after the maximum number of retries, then the originator may become the multicast group leader for this new multicast group if it still wishes to form/join this group at 135. The new multicast group leader will send out the Group Hello for this multicast group once it becomes the multicast group leader.

If the joining member node obtains the multicast group leader's IEEE 802.11 MAC address from its multicast information base from one or more GDREs, it then sends a JOIN message with an acknowledgement flag set at 130 towards the multicast group leader of the multicast group in unicast. The JOIN message contains the multicast group address, the multicast group leader address, the addresses of nodes joining this multicast group and the flags. The JOIN message is forwarded hop-by-hop towards the multicast group leader establishing the routes in each intermediate node through which it passes. The multicast group leader responds by returning a Join Acknowledgement (JACK) message to the joining member node after it receives the JOIN message with an acknowledgement flag set. If the joining member does not receive the JACK message within a specific period, it retransmits the JOIN message with the acknowledgement flag set. A determination is made at 137 if a Join acknowledgement message has been received. It continues to do this until it receives a JACK message from the multicast group leader or the retry limit is reached at 139. If no reply is received after this pre-determined maximum number of retries, the joining member returns to the group discovery phase. The route is used to forward the data frames destined to this multicast group from all the other sources in the multicast group to the new member node at 140 and also forward the data frames initiated by the new member node and destined for the multicast group to all other member nodes in the multicast group. When multiple nodes join the multicast group, the JOIN messages converge on the multicast group leader and a tree is created for multicast group G. The tree is rooted at the multicast group leader and shared by the nodes in the multicast group G, and is called the shared tree or (*, G) tree. The data frames generated by a source S in the multicast group G destined for G are forwarded from the source along the multicast tree and eventually reach all the receivers for that multicast group.

The established routes for the multicast tree have a limited lifetime. The (*, G) JOIN messages are re-sent periodically by a member node to refresh the routes as long as the node remains in the multicast group. The acknowledgement flag is not set in the JOIN message for refreshment. A node of the multicast tree tracks the join membership of individual downstream nodes (the node farther from the multicast group leader). The route lifetime parameter is updated each time that a JOIN message is received from downstream member nodes. A JOIN message may contain multiple downstream nodes that want to join or remain in the group. If a node of the multicast tree does not receive any JOIN message from its downstream nodes for the specific lifetime, the tree branch/route to the downstream nodes expires and the multicast data would not be forwarded downstream through the corresponding radio interface.

In an alternative embodiment, an upstream node of an active multicast tree periodically sends a Query message in order to maintain active routes for the multicast tree. A downstream neighbor/node of the multicast tree responds with Report message if the downstream node remains in the multicast group. If there is no Report for K Query messages, the upstream node assumes that there are no downstream nodes for this multicast group. K is a pre-determined retry limit.

The routes via the group shared tree may involve a detour for some receivers/destinations when compared with the shortest path from the source to the receivers/destinations. To use the bandwidth more efficiently, a multicast group member may optionally start a process to transfer from the shared tree to a source-specific shortest-path tree (S, G) by issuing an (S, G) Join after it receives the multicast data frames with a source address of source node S at 150. The (S, G) Join is forwarded hop-by-hop towards source node S. It establishes the routes in each intermediate node through which it passes. The routes are used to forward data frames generated by the source node S for group G (i.e. with the source and destination address pair (S, G)). The data frames generated by source node S for the Group G are then forwarded along the (S, G) tree towards the receiver.

The receiver or one of its upstream nodes will receive two copies of the data, one from the source-specific tree and one from the multicast group shared tree. Once the first data frame is received from the source-specific tree, the data frames for multicast group G from source node S that arrive from the multicast group shared tree will be dropped. Furthermore, the node which received two copies of data sends an (S, G) Prune message towards the multicast group leader. The Prune message is forwarded hop-by-hop along path on the multicast group shared tree towards the multicast group leader. The (S, G) Prune instructs the intermediate nodes to stop forwarding the data frames from source node S for multicast group G in this direction. The prune is forwarded until it reaches the multicast group leader or a node that still needs the data from source node S for other receivers. After this process, the receiver then only receives data from source S along the source specific tree between the receiver and the source.

Figure 2A:
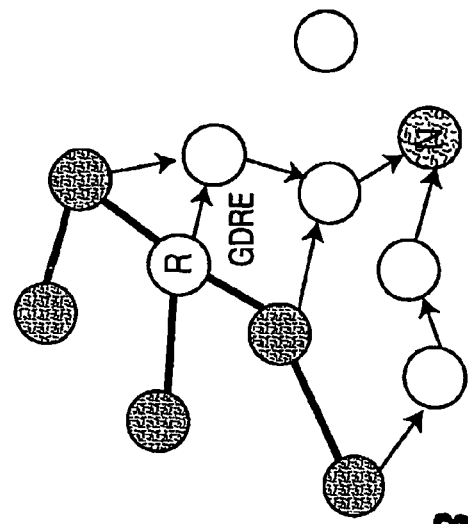
FIG. 2A illustrates a new node flooding the mesh network group discovery (GDIS) message in order to find multicast group G information so that it can join multicast group G.
Figure 2B:
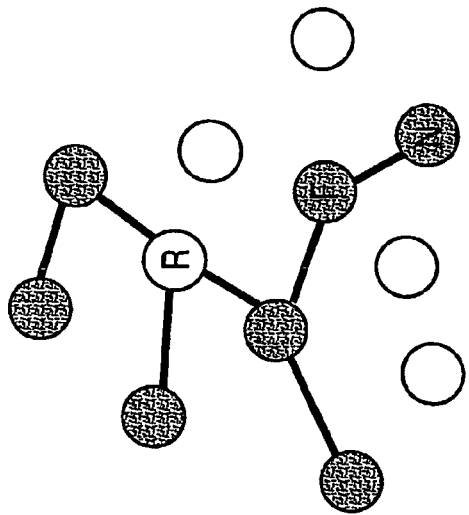
FIG. 2B depicts the group discovery reply (GDRE) messages that are returned to the originator of the group discovery request (GDIS) message by different multicast group members.
Figure 2C:
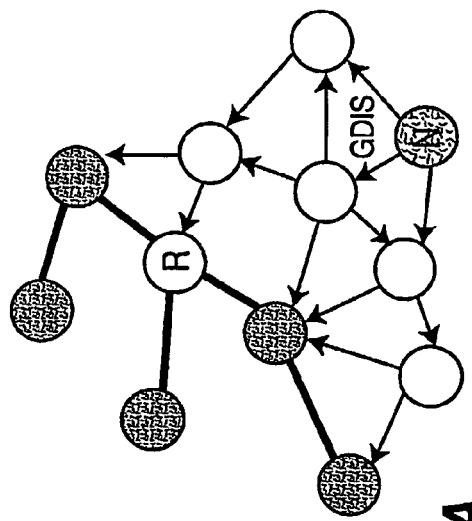
FIG. 2C shows the originator of the group discovery request (GDIS) message transmitting a JOIN message and receives a join acknowledgement message from the group leader.
Figure 2D:
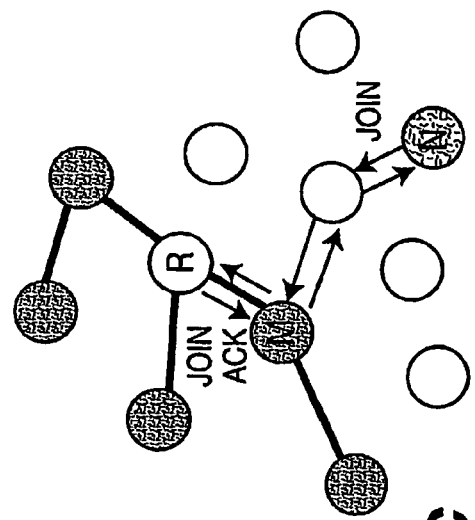
FIG. 2D shows the new node having been added to the multicast group.

FIGS. 2A-2D show how a new node "N" joins a multicast group rooted at the node R. The dark shaded nodes are members of the multicast group. The white nodes are nodes that are not members of the multicast group. Referring now to FIG. 2A, node "N" is a new node that wants to join the multicast group G. There is no information about multicast group G in node N's multicast information base. Node "N" then floods the mesh network with GDIS messages in its attempt to locate multicast group G information. The GDIS messages are transmitted through nodes that are not members of the multicast group until the GDIS messages reach nodes that are members of the multicast tree. FIG. 2B depicts the GDRE messages that are returned to the new node wishing to join the multicast group. The GDRE messages are sent back to the new node in unicast by different multicast group members. FIG. 2C shows the new node transmitting a JOIN message. The JOIN message is transmitted hop-by-hop towards the multicast group leader R and the group leader R returns a JACK message. FIG. 2D shows the new member node N having been added to the multicast group and the tree branch to the new member N that is created. A node F that was not a member of the multicast group has been also added as a forwarding node and thus, has become a member of the multicast tree.

Even before a node joins a multicast group, it may send the data frames destined for the multicast group to the multicast group leader in unicast if it knows the multicast group leader's IEEE 802.11 MAC address and the unicast route to the multicast group leader. The multicast group leader re-distributes the data frames to the receivers/destinations in this multicast group through the multicast group shared tree. There are four addresses fields in the header of an IEEE 802.11 data frame. Addresses 14 correspond to receiver address (RA), transmitter address (TA), destination address (DA), and source address (SA). The RA represents the intended immediate recipient of the data frame. The TA is the IEEE 802.11 MAC address of the data frame transmitter. The DA represents the final destination of the data frame. The SA is the IEEE 802.11 MAC address of the source that initiated the data frame. When a source node S wants to send a data frame destined for a multicast group G in unicast to the multicast group leader, it checks its multicast information base for the multicast group leader's MAC address and the unicast routing table for the next hop to the multicast group leader. It sets the TA in the data frame as its own IEEE 802.11 MAC address (since it is the transmitter of this data frame), the RA is set to the next hop's IEEE 802.11 MAC address (since this is the intended immediate recipient), the DA is set to the multicast group's IEEE 802.11 MAC address G (since it is the final destination of this data frame) and the SA is set to its own IEEE 802.11 MAC address S (since it initiated this data frame). This frame is called a Tunnel Frame. It has a unicast RA address and a DA for the multicast group G. Note that this Tunnel Frame is different from a normal multicast data frame, in which both the RA and DA are the multicast group's address G. The source node sends the tunnel frame to the next hop towards the multicast group leader. The next hop node receives the tunnel frame with RA, its own address and DA the multicast group address. The next hop then checks its multicast information base for the multicast group leader's IEEE 802.11 MAC address and the unicast routing table for the route to the multicast group leader and changes the TA address to it own address (since it is the transmitter) and the RA address of its immediate upstream node towards the multicast group leader. The SA and DA addresses are kept the same. The data frame is then sent to the upstream node towards the multicast group leader. The upstream node processes the data frame in the same way. The data frame travels hop-by-hop towards the multicast group leader. Eventually it reaches the multicast group leader. Once the multicast group leader receives the tunnel frame, it changes the data frame's RA address to the multicast group's IEEE 802.11 MAC address G and distributes the data frame on the multicast group's shared tree. The data frame is then forwarded on the multicast group shared tree and reaches all the receivers/destinations for this multicast group.

If a leaf node, that is a member of the multicast group, wishes to exit/depart from the multicast group, then it unicasts a PRUNE message to its upstream node along the multicast tree of the multicast group. Once the upstream node receives the PRUNE message, it deletes the routing information for the node that transmitted the PRUNE message to it. A node on the multicast tree tracks the join membership of individual downstream nodes and maintains downstream active neighbor/node list. If the node sending the PRUNE message is the last downstream node, this tree branch is pruned and no further data traffic will be sent downstream over the corresponding radio interface. For additional reliability, the node sends a PruneEcho message before it prunes a branch. It waits for a specific period to see whether the prune is overridden by another downstream neighbor remaining in the multicast group. If a downstream neighbor remaining in the multicast group receives a PruneEcho from its upstream neighbor, it immediately sends a JOIN message to override the PruneEcho. Note that the PruneEcho message is only sent to the immediate neighbors and is not propagated further. If another remaining downstream node uses the tree, the tree branch cannot be pruned. With the deletion of the downstream node, if the node becomes a leaf node and it does not want to receive the data destined for this multicast group or send data to the multicast group, then it prunes itself from the multicast tree by sending a PRUNE message upstream along the multicast tree.

Figure 3B:
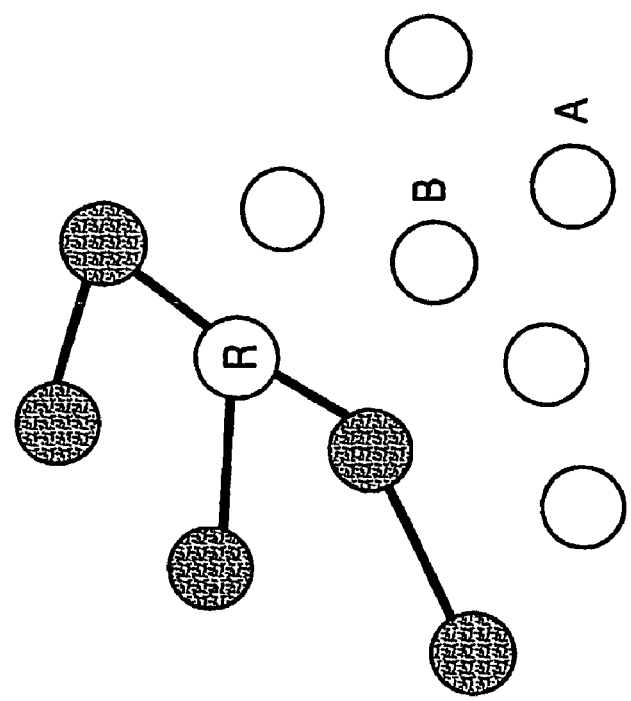
FIG. 3B shows the multicast tree after pruning.
Figure 3A:
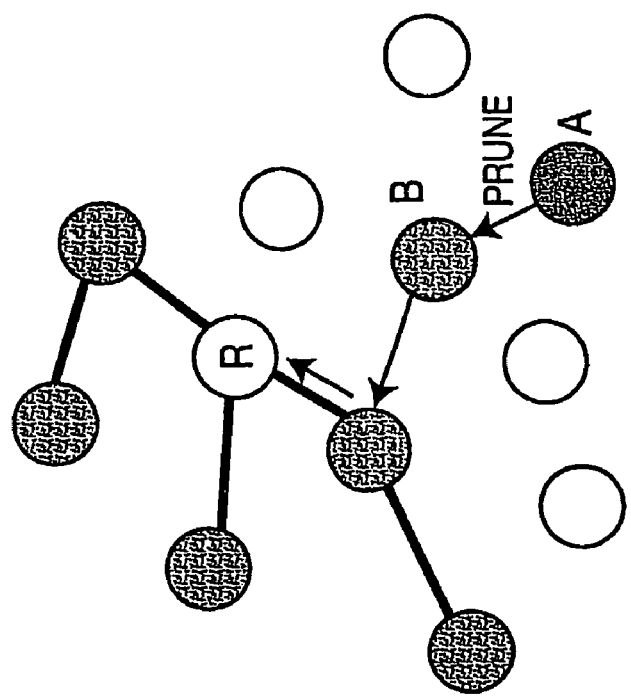
FIG. 3A illustrates how a multicast leaf node exits/departs a multicast group.

FIGS. 3A-3B show how a node "A" relinquishes its membership in a multicast group. The dark shaded nodes are members of the multicast group. The white nodes are nodes that are not members of the multicast group. FIG. 3A illustrates how a multicast leaf node leaves/exits/departs a multicast group. Node "A" sends a PRUNE message in order to relinquish its membership in the multicast group. FIG. 3B shows the multicast tree after pruning. After node "A" relinquished its membership from the multicast group, node "B" was left as a leaf node. Not wanting to continue its membership in the multicast group by itself, it pruned itself from the multicast tree.

If the multicast group leader fails or becomes unavailable, the neighbor multicast group member of the failed multicast group leader becomes the new multicast group leader. It is possible that the failed multicast group leader has several neighbor members in that multicast group. The neighbor member with the lowest IEEE 802.11 MAC address becomes the new multicast group leader. The new multicast group leader is determined through a selection process as follows. All potential multicast group leaders, i.e. the neighbor multicast group members of the failed multicast group leader send out the Group Hello messages, with its own IEEE 802.11 MAC address as the candidate multicast group leader address. If a potential multicast group leader sees a GHLO message with a lower IEEE 802.11 MAC address, it gives up its multicast group leadership bid. Then the neighbor member of the failed multicast group leader with the lowest IEEE 802.11 MAC address becomes the new multicast group leader. The new multicast group leader sends out GHLO messages periodically and the other members join the shared multicast tree rooted in the new multicast group leader.

In an alternative embodiment, the Group Hello message carries the IEEE 802.11 MAC addresses of the backup multicast group leader. The backup multicast group leader is the neighbor member of the current multicast group leader with the lowest IEEE 802.11 MAC address. This information is stored in the multicast information database of the nodes. If the multicast group leader fails or becomes unavailable, the backup multicast group leader assumes to be the new multicast group leader. If the multicast group leader and the backup multicast group leader simultaneously fail or become unavailable, the new multicast group leader is determined by the above selection process among the remaining neighbor members of the failed multicast group leader and backup multicast group leader.

It is possible that multiple multicast group leaders temporarily exist for a multicast group in the mesh network. This occurs when the old multicast group leader fails as described before or when multiple nodes want to join a new multicast group at the same time, or partitioned multicast trees are reconnected. This scenario can be detected if a node receives a GHLO message for the same multicast group that contains multicast group leader information different from its own records. It is corrected according to the above selection rule, i.e. the multicast group leader should the one with the lowest IEEE 802.11 MAC address. If a multicast group leader receives a GHLO message for a multicast group of which it is a leader and if the multicast group leader information contained in that message indicates that a different node is the multicast group leader, it implies that two multicast group leaders exist for two partitioned multicast trees. A repair of the multicast tree is needed. The multicast group leader with a higher IEEE 802.11 MAC address gives up its multicast group leadership and sends a JOIN message to the other multicast group leader.

When a link is broken, the node downstream of the break (i.e., the node farther from the multicast group leader) attempts to repair it. Actually, it is an attempt to bypass the broken link and generate an alternate path back into the multicast tree. It is assumed that the unicast mesh routing protocol could and would repair the unicast mesh routing table. After the unicast mesh routing table is repaired, the downstream node that is responsible for repairing the broken link sends a JOIN towards the multicast group leader. If it is not possible to repair the multicast tree by rejoining the multicast tree then the downstream node responsible for bypassing the broken link becomes the new multicast group leader for a new multicast tree.

Figure 4A:
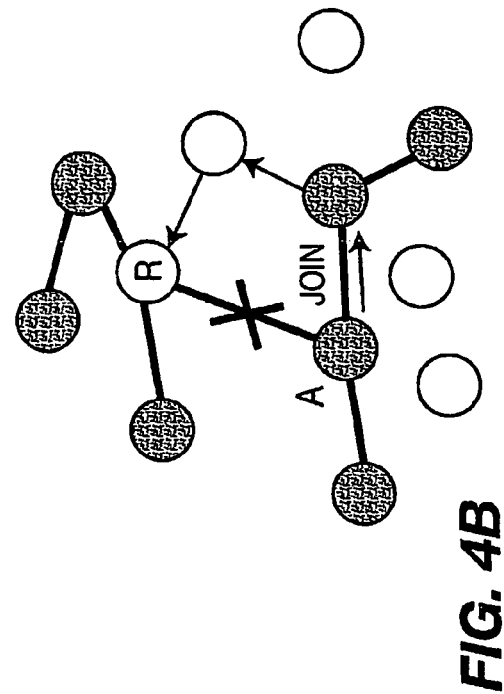
FIG. 4A illustrates a multicast tree with a broken link.
Figure 4B:
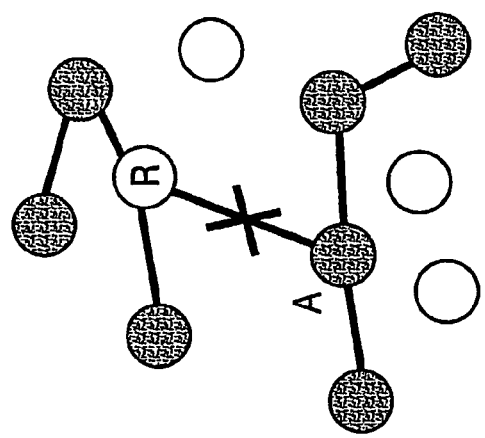
FIG. 4B depicts the downstream node attempting to bypass the broken link.
Figure 4C:
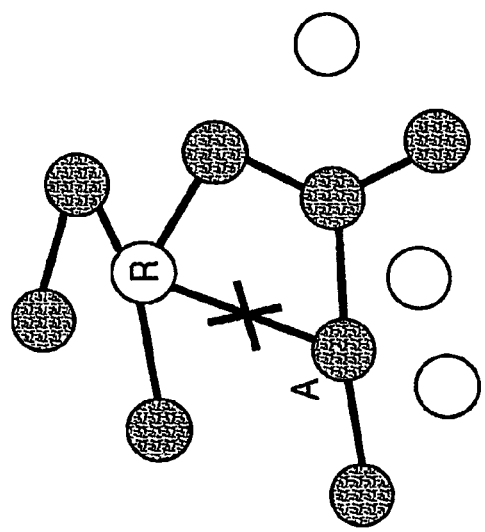
FIG. 4C depicts the repaired multicast tree that bypasses the broken link.

FIGS. 4A-4C illustrate repairing a broken multicast tree link. FIG. 4A illustrates a multicast tree with a broken link. In this instance the link between node "A" and root "R" is broken. FIG. 4B depicts the downstream node (Node "A") attempting to bypass the broken link by sending out a JOIN message requesting to join the multicast group. FIG. 4C depicts the repaired multicast tree with the broken link bypassed. As noted earlier the broken link is not actually repaired but rather is bypassed by using the available new unicast mesh route to the multicast tree root.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for a node to select a route to join a multicast group in a wireless mesh network, said method comprising establishing said route between said node and said multicast group using media access control addresses; and
    maintaining by each node of said wireless mesh network currently used routes of said multicast group in a multicast information base.

2. The method according to claim 1, wherein said multicast group is dynamic and any node is able to dynamically join or depart said multicast group at any time.

3. The method according to claim 2, wherein said node departing from said multicast group retains its membership in said wireless mesh network.

4. The method according to claim 2, wherein a departing node unicasts a prune message to its upstream node along a multicast tree of said multicast group.

5. The method according to claim 4, wherein said upstream node deletes said routing information for said departing node.

6. The method according to claim 4, wherein a tree branch to said departing node is pruned if said departing node is a last downstream node and no further data will be communicated over a radio link corresponding to said pruned tree branch.

7. The method according to claim 6, wherein said upstream node transmits a prune echo message before it prunes said tree branch.

8. The method according to claim 7, wherein said upstream node waits for a pre-determined time period to receive a prune_override message from a node downstream to said upstream node.

9. The method according to claim 8, wherein said prune_override message is a join message.

10. The method according to claim 7, wherein said upstream node prunes itself from said multicast group by sending a prune message to its upstream node if said upstream node becomes a leaf node as a result of pruning said departing node and said tree branch to said departing node, and said leaf node does not want to continue to communicate with said multicast group.

11. The method according to claim 4, further comprising bypassing a broken multicast tree link.

12. The method according to claim 1, further comprising:
    checking, by said joining node, a multicast information base for multicast group information based on said multicast group's media access control address;
    broadcasting, by said joining node, a group discovery message if no information is located in said multicast information base regarding said multicast group;
    receiving, by said joining node, at least one group discovery reply message to said group discovery message;
    transmitting, by said joining node, a join message towards a root node of said multicast group; and
    transmitting, by said joining node, data destined for every other node of said multicast group.

13. The method according to claim 12, wherein said broadcasting step is repeated until a pre-determined retry limit is exceeded.

14. The method according to claim 13, wherein said joining node becomes a root node of a new multicast group.

15. The method according to claim 14, wherein said root node broadcasts a group_hello message to advertise itself as a multicast group leader of said new multicast group.

16. The method according to claim 12, wherein said joining node transmits a join message to a source node that is a member of said multicast group in order to receive data from a source tree rooted at said source node.

17. The method according to claim 12, wherein said broadcasting step includes transmitting said group discovery message through nodes that are not members of said multicast group.

18. A method for a node wishing to join a multicast group whereby said node determines a multicast group leader of said multicast group of a wireless mesh network using media access control addresses.

19. The method according to claim 18, wherein said multicast group leader advertises their multicast group leadership by transmitting group-hello messages across said wireless mesh network.

20. The method according to claim 18, wherein said joining node performs a search of a multicast information base using said multicast group's media access control address and uses multicast group information located to join said multicast group.

21. The method according to claim 20, wherein no information was located for said multicast group and said joining node broadcasts a group discovery message across said wireless mesh network.

22. The method according to claim 21, wherein said joining node receives response group discovery response from said multicast group leader and from multicast group members.

23. The method according to claim 22, wherein said group discovery reply includes said multicast group's sequence number, said multicast group's media access control address, and said multicast group's information.

24. The method according to claim 21, wherein said group discovery message includes said node's media access control address, a sequence number, the media access control address of the multicast group to be joined and a time-to-live parameter.

25. A method of determining a multicast group leader, said method comprising one of several neighbor multicast group members becomes a new multicast group leader in the event a current multicast group leader becomes unavailable or fails.

26. The method according to claim 25, wherein one of said several neighbor multicast group members with a lowest media access control address becomes said new multicast group leader.

27. The method according to claim 26, wherein each of said several neighbor multicast group members transmits a group_hello message including a media access control address to select the new multicast group leader.

28. A system for a node to select a route to join a multicast group in a wireless mesh network, comprising means for establishing said route between said node and said multicast group using media access control addresses; and means for determining a multicast group leader of said multicast group of a wireless mesh network using media access control addresses.

29. The system according to claim 28, further comprising means for one of a plurality of neighbor multicast group members to become a new multicast group leader in the event a current multicast group leader becomes unavailable or fails.

30. The system according to claim 28, wherein a backup multicast group leader assumes control.

31. The system according to claim 30, wherein if said backup multicast group leader becomes unavailable or fails then a new multicast group leader is selected using media access control addresses.

\* \* \* \* \*